United States Patent
Honda et al.

(10) Patent No.: US 6,963,473 B2
(45) Date of Patent: Nov. 8, 2005

(54) HEAD ARM ASSEMBLY AND DISK DRIVE DEVICE WITH THE HEAD ARM ASSEMBLY HAVING ENHANCED IMPACT RESISTANCE

(75) Inventors: Takashi Honda, Tokyo (JP); Katsuki Kurihara, Tokyo (JP); Takeshi Wada, Tokyo (JP); Kai Wu, Guangdong (CN); Kaoru Matsuoka, Osaka (JP); Hideki Kuwajima, Kyoto (JP)

(73) Assignees: TDK Corporation, Tokyo (JP); SAE Magnetics (H.K.) Ltd., Kwai Chung (HK); Matsushita Electric Industrial Co., Ltd., Osaka (JP)

( * ) Notice: Subject to any disclaimer, the term of this patent is extended or adjusted under 35 U.S.C. 154(b) by 115 days.

(21) Appl. No.: 10/600,435

(22) Filed: Jun. 23, 2003

(65) Prior Publication Data

US 2004/0047077 A1 Mar. 11, 2004

(30) Foreign Application Priority Data

Jun. 28, 2002 (JP) .............................. 2002-189844

(51) Int. Cl.[7] .............................................. G11B 5/55
(52) U.S. Cl. ................................ 360/294.7; 360/266.1
(58) Field of Search ........................... 360/294.7, 266.1

(56) References Cited

U.S. PATENT DOCUMENTS 6,456,463 B1 * 9/2002 Van Sloun ............... 360/266.1
6,717,776 B2 * 4/2004 Boutaghou ............... 360/294.7

OTHER PUBLICATIONS

U.S. Appl. No. 10/463,514, filed Jun. 18, 2003, Wada et al.
U.S. Appl. No. 10/600,435, filed Jun. 23, 2003, Honda et al.
U.S. Appl. No. 10/626,603, filed Jul. 25, 2003, Honda et al.

* cited by examiner

*Primary Examiner*—A. J. Heinz
(74) *Attorney, Agent, or Firm*—Oblon, Spivak, McClelland, Maier & Neustadt, P.C.

(57) ABSTRACT

A head arm assembly (HAA) includes a head slider having at least one head element, an arm member for supporting the head slider at one end section, an actuator, mounted to the other end section of the arm member, for rotationally moving the arm member in a direction substantially parallel with a recording medium surface around an axis for horizontal rotation of the arm member, and a load generation unit for generating a load for energizing the head slider in a direction to the recording medium surface by rotationally moving the arm member in a direction substantially orthogonal to the recording medium surface around an axis for vertical rotation. The position of the center of gravity of the HAA is located at a different position from the axis for vertical rotation on a center axis of the arm member.

24 Claims, 11 Drawing Sheets

US 6,963,473 B2

HEAD ARM ASSEMBLY AND DISK DRIVE DEVICE WITH THE HEAD ARM ASSEMBLY HAVING ENHANCED IMPACT RESISTANCE

FIELD OF THE INVENTION

The present invention relates to a head arm assembly (HAA) having a recording and/or a reproducing head such as a flying type thin-film magnetic head or a flying type optical head, and to a disk drive device with the HAA.

DESCRIPTION OF THE RELATED ART

In a magnetic disk drive device, a magnetic head slider for writing magnetic information into and/or reading magnetic information from a magnetic disk is in general formed on a magnetic head slider flying in operation above a rotating magnetic disk. The slider is fixed at a top end section of an HAA.

The conventional HAA includes a support arm with high rigidity, a voice coil motor (VCM) that is an actuator to rotationally move this support arm in parallel with a magnetic disk surface, a suspension having elasticity, which is fixed to a tip end of the support arm, and a magnetic head slider mounted to a top end section of the suspension, and it is constructed so that a load applied to the magnetic head slider in a direction to the magnetic disc surface generated with a leaf spring provided at the suspension itself, or a leaf spring provided at a connecting section of the suspension and the support arm.

In the HAA with the conventional structure as described above, the magnetic head slider is mounted to the suspension at the tip of the leaf spring, and therefore when an impact is applied thereto from outside, there is a fear that the magnetic head slider is strongly vibrated and collided against the magnetic disk surface, and gives a damage to the disk surface.

In order to improve resistance of the HAA with the conventional structure against the impact, an HAA with a new structure, in which a main part of the HAA is constructed by an arm member with high rigidity, a magnetic head slider is mounted to one end section of the arm member while a VCM is mounted to the other end section, a support point to make it possible to rotationally move in a direction orthogonal to the surface of the magnetic disc is provided in the middle of the one end and the other end of the arm member, and a leaf spring for load generation is mounted to that section, is researched and developed (not known at the time of this application).

SUMMARY OF THE INVENTION

It is therefore an object of the present invention to provide a new structure HAA capable of enhancing having an impact resistance, and a disk drive device including the HAA.

According to the present invention, an HAA includes a head slider having at least one head element, an arm member for supporting the head slider at one end section, an actuator, mounted to the other end section of the arm member, for rotationally moving the arm member in a direction substantially parallel with a recording medium surface around an axis for horizontal rotation of the arm member, and a load generation unit for generating a load for energizing the head slider in a direction to the recording medium surface by rotationally moving the arm member in a direction substantially orthogonal to the recording medium surface around an axis for vertical rotation. The position of the center of gravity of the HAA is located at a different position from the axis for vertical rotation on a center axis of the arm member.

Also, according to the present invention, a disk drive device including at least one of the HAA is further provided.

The head slider and the actuator such as a VCM are mounted to respective end sections of an arm member, and the axis for horizontal rotation is located between them. The arm member is constructed to be able to rotationally move in the direction substantially orthogonal to the recording medium surface around the axis for vertical rotation, and the head slider is biased in the direction of the recording medium surface by the load generation unit. In the HAA with such a new structure, the position of the center of gravity is set to be displaced to a different position from the axis for vertical rotation on the center axis of the arm member. By appropriately selecting the displacement of this position of the center of gravity, it becomes possible to keep the load applied to the head slider substantially constant irrespective of the positive and negative direction, i.e., sense, and the value of the impact acceleration applied from outside, and it becomes possible to enhance impact resistance dramatically. By adjusting the displacing amount and the positive and negative direction, i.e., sense, of the position of the center of gravity, the load property applied to the head slider with respect to the impact acceleration applied from outside can be varied. Accordingly, it becomes possible to compensate positive pressure or negative pressure occurring to an air bearing surface (ABS) of the head slider during rotation of the recording medium with this displacing amount. As a result, degree of freedom of the ABS design of the head slider is improved to a large extent, and it also becomes possible to obtain a desired flying property for the head slider with the ABS area being very small.

It is preferred that a force applied to the head slider by a rotational moment occurring due to an applied impact acceleration and a displacement of the position of the center of gravity is set to be not more than negative pressure or positive pressure occurring to an ABS of the head slider due to rotation of the recording medium.

It is also preferred that the position of the center of gravity is located at a position between the actuator and the vertical rotation axis.

It is preferred that the position of the center of gravity is a position which substantially satisfies $L_2 = M_1 \times L_1 / M_2$, where $M_1$ is a mass at a load point to the head slider, $M_2$ is a mass at the position of the center of gravity, $L_1$ is a distance between a load point to the head slider and the vertical rotation axis, $L_2$ is a distance between the vertical rotation axis and the position of the center of gravity.

It is further preferred that when the position of the center of gravity is at a position which substantially satisfies $L_2 > M_1 \times L_1 / M_2$, an ABS of the head slider is set so that positive pressure occurring to the ABS due to rotation of the recording medium is not less than a product of an inertial force obtained from a mass of a part from the position of center of gravity of the head arm assembly to the head slider and an applied impact acceleration.

It is preferred that when the position of the center of gravity is at a position which substantially satisfies $L_2 < M_1 \times L_1 / M_2$, where $M_1$ is a mass at a load point to the head slider, $M_2$ is a mass at the position of the center of gravity, $L_1$ is a distance between a load point to the head slider and the vertical rotation axis, $L_2$ is a distance between the vertical rotation axis and the position of the center of gravity, an ABS of the head slider is set so that negative pressure occurring to the ABS due to rotation of the recording medium is not less than a product of an inertial force obtained from a mass of a part from the position of center of gravity of the head arm assembly to the head slider and an applied impact acceleration.

It is also preferred that the position of the center of gravity is located at a position between the head slider and the vertical rotation axis.

It is further preferred that when the position of the center of gravity is at a position which substantially satisfies $L_2 < M_1 \times L_1/M_2$, where $M_1$ is a mass at a load point to the head slider, $M_2$ is a mass at the position of the center of gravity, $L_1$ is a distance between a load point to the head slider and the vertical rotation axis, $L_2$ is a distance between the vertical rotation axis and the position of the center of gravity, an ABS of the head slider is set so that negative pressure occurring to the ABS due to rotation of the recording medium is not less than a product of an inertial force obtained from a mass of a part from the position of center of gravity of the head arm assembly to the head slider and an applied impact acceleration.

It is still further preferred that the axis for horizontal rotation is provided at a horizontal rotation bearing part located at a midpoint of the arm member, and the axis for vertical rotation includes a protuberance provided in the vicinity of the horizontal rotation bearing part.

It is preferred that the load generation unit includes a leaf spring connected to the horizontal bearing part and to the arm member.

It is also preferred that the arm member includes a support arm having rigidity, and a flexure having elasticity, which is supported at one end section of the support arm and for controlling a flying attitude of the head slider, and the head slider is fixed on the flexure. In this case, preferably the arm member further includes a load beam having rigidity and including a load protrusion for applying load to the head slider, the flexure being fixed on the load beam.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
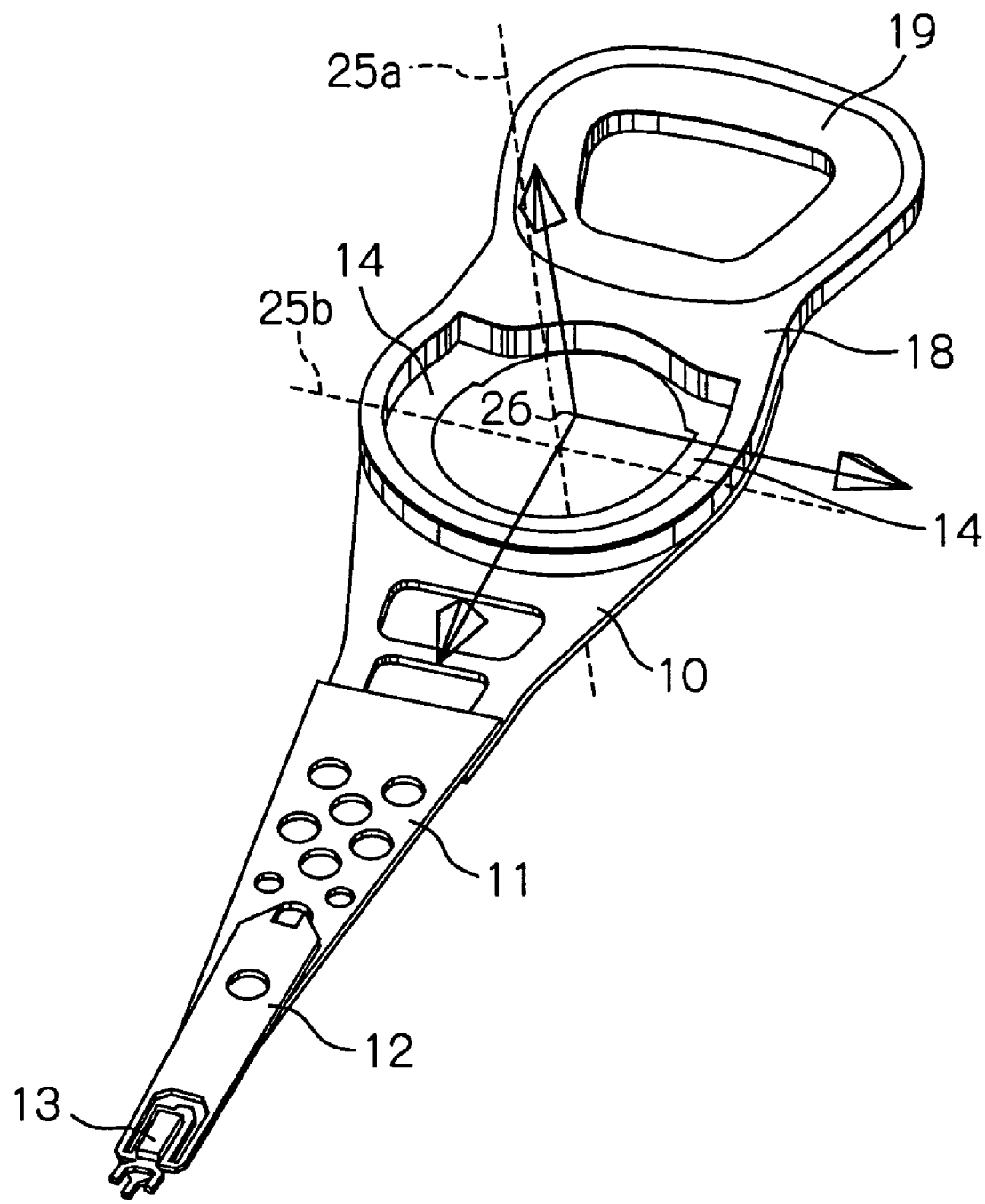
FIG. 1 is a perspective view schematically illustrating a construction of an HAA in a preferred embodiment according to the present invention.
Figure 2:
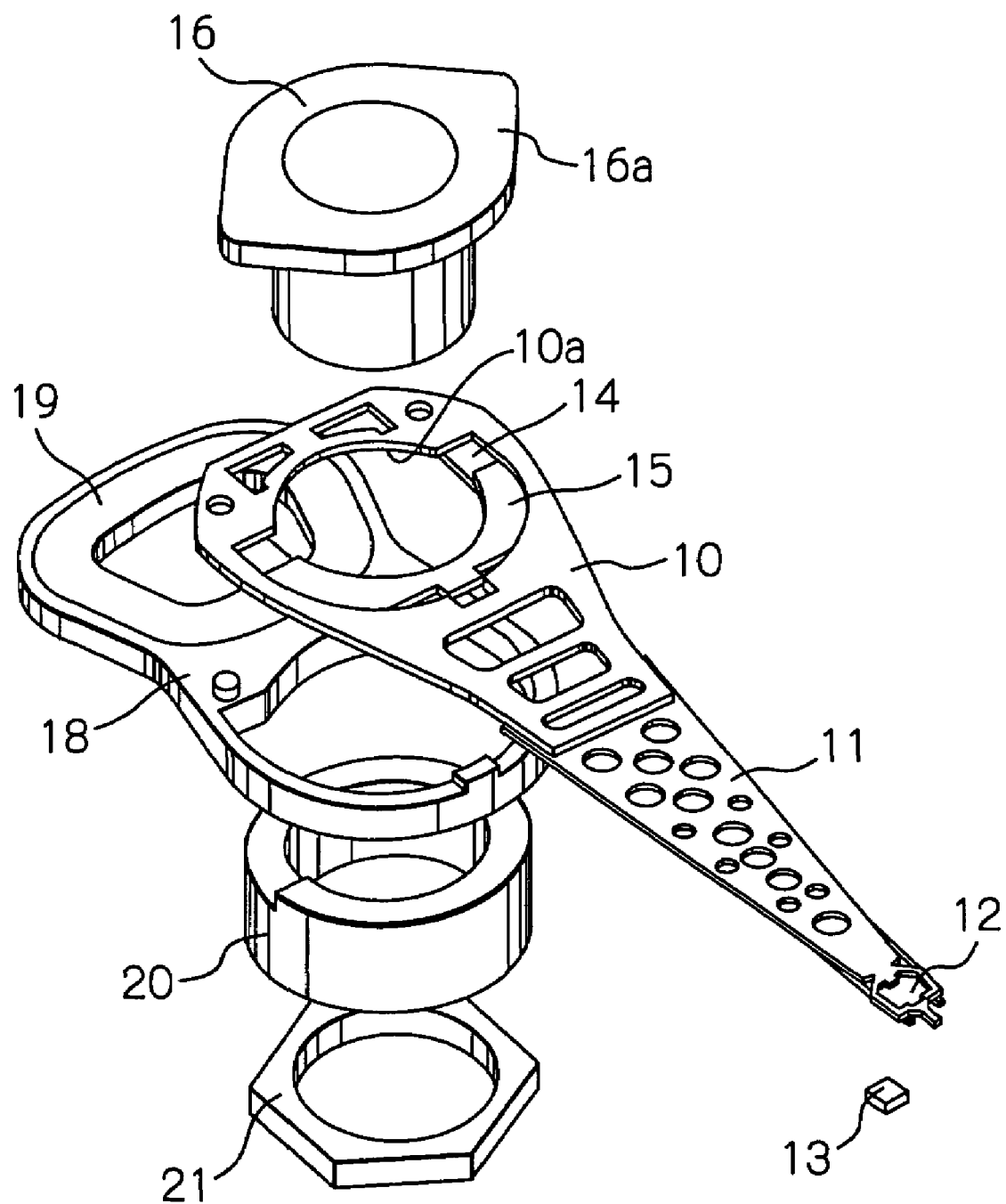
FIG. 2 is an exploded perspective view illustrating the HAA in FIG. 1 and its mounting part.
Figure 3:
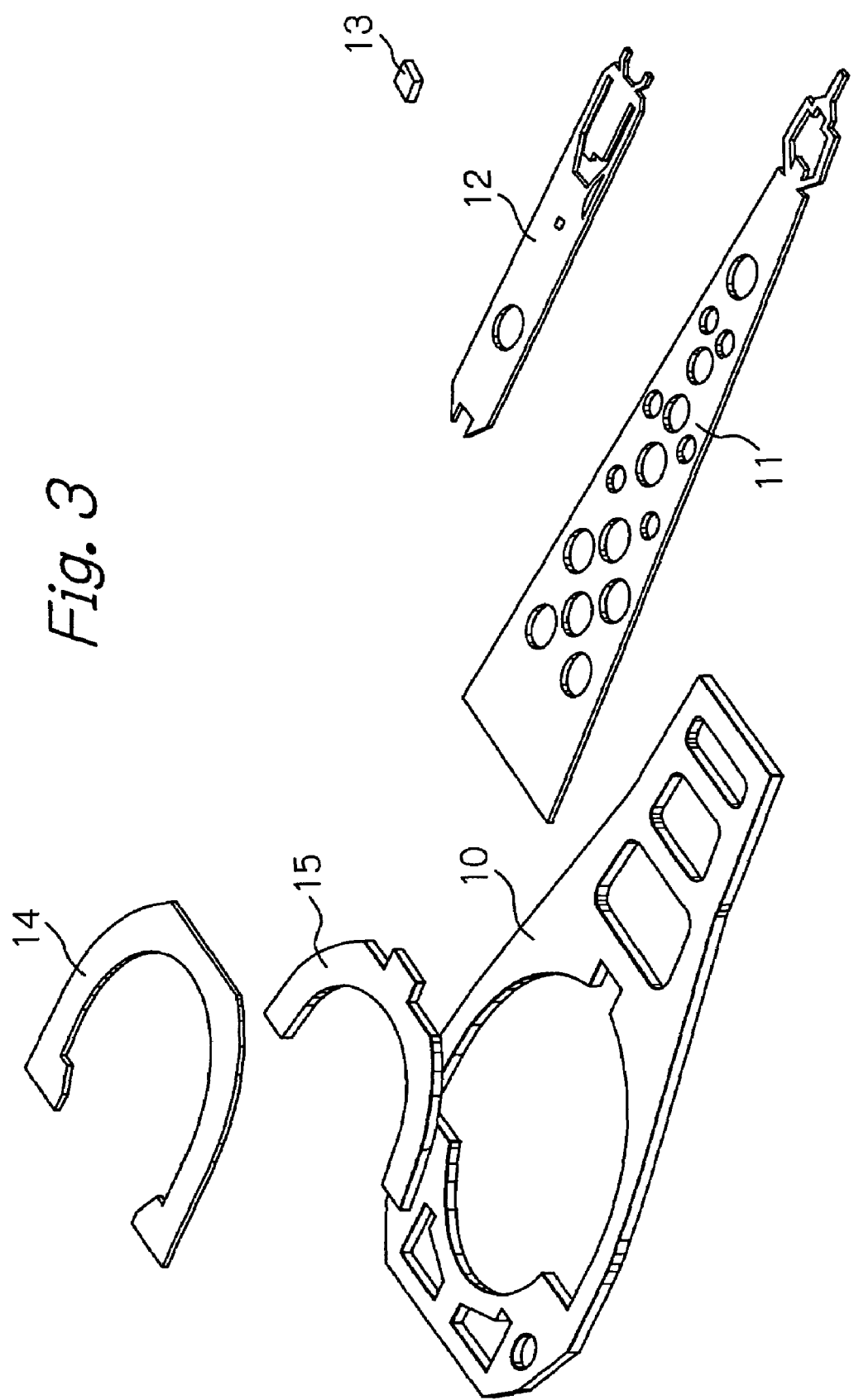
FIG. 3 is an exploded perspective view illustrating the part of the HGA in FIG. 1.
Figure 4:
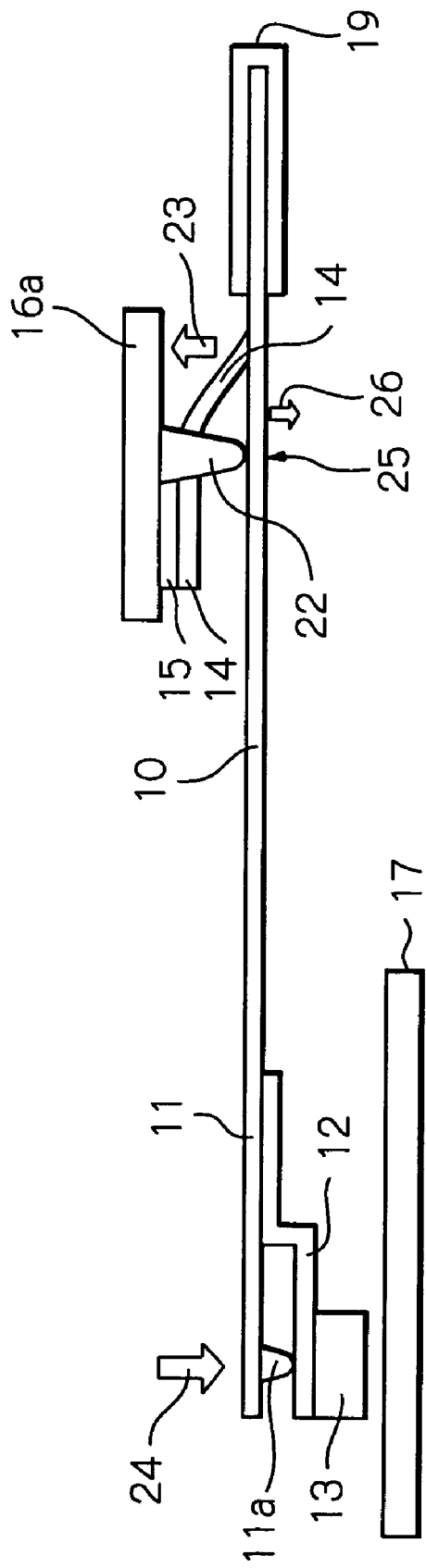
FIG. 4 is a side view schematically illustrating a construction of the HAA in FIG. 1.

FIG. 1 schematically illustrates a construction of an HAA in a preferred embodiment of the present invention, FIG. 2 illustrates the HAA and a mounting part thereof, FIG. 3 illustrates a part of a head gimbal assembly (HGA) thereof, and FIG. 4 schematically illustrates a construction of the HAA. It should be noted that FIGS. 1 and 3 are views of the HAA seen from below (a side facing a magnetic disk), and FIG. 2 is a view of the HAA seen from the opposite direction from that in FIGS. 1 and 3.

In these drawings, reference numeral 10 denotes a support arm having high rigidity, 11 denotes a load beam also having high rigidity with its base section fixed to a top end section of the support arm 10, 12 denotes a flexure which is fixed to a top end section of the load beam 11 and has elasticity to control a flying attitude of a magnetic head slider 13, 13 denotes the magnetic head slider which is fitted to a tip end of the flexure 12 and includes at least one magnetic head element, 14 denotes a leaf spring for generating a load applied to the magnetic head slider 13, 15 denotes a fixing member for this leaf spring 14, 16 denotes a horizontal bearing part (bearing housing) for rotationally moving the support arm 10 in a direction parallel with the surface of a magnetic disk 17, 18 denotes a coil assembly which has a coil 19 for a VCM and is mounted to the support arm 10, 20 denotes a mounting spacer, and 21 denotes a nut, respectively.

The support arm 10 is constructed by a metal plate member having sufficient rigidity, for example, a stainless steel plate (for example, SUS304TA) about 330 μm thick, or a resin plate member.

The load beam 11 is constructed by a metal plate member having sufficient rigidity, for example, a stainless steel plate (for example, SUS304TA) about 40 $\mu$m thick. The load beam 11 and the support arm 10 are fixed by pinpoint fixation by a plurality of welded points with use of a laser beam or the like when the support arm 10 is a metal plate member.

The flexure 12 is constructed so as to give suitable stiffness to the magnetic head slider 13 pressed and loaded by a dimple 11a being a protuberance for applying a load provided at a top end section of the load beam 11. The flexure 12 is constructed by a stainless steel plate (for example, SUS304TA) about 25 $\mu$m thick in this embodiment. The flexure 12 and the load beam 11 are fixed by pinpoint fixation by a plurality of welded points with use of a laser beam or the like.

The leaf spring 14 is formed of a metal leaf spring material in substantially a circular shape or substantially a semicircular shape, and its thickness and quality are suitably selected so as to be able to give a desired load to the magnetic head slider 13. In this embodiment, the leaf spring 14 is constructed by a stainless steel plate (for example, SUS304TA) about 40 $\mu$m thick. The leaf spring 14 is placed to be coaxial with the fixing member 15, a mounting hole 10a of the support arm 10 and the bearing housing 16, both end sections of the semicircular shape are fixed to the support arm 10, and a central portion is fixed to the bearing housing 16 via the fixing member 15. Accordingly, the support arm 10 is supported by the bearing housing 16 via the leaf spring 14. A rotation axis of the bearing housing 16 is an axis for horizontal rotation 25a of the support arm 10, accordingly, the HAA, and the bearing housing 16 and the support arm 10 rotationally move together in the horizontal direction with this rotation axis 25a as the center.

The fixing member 15 is formed of a metal plate with high rigidity in substantially a semicircular shape, and in this embodiment, it is constructed by, for example, a stainless steel plate (for example, SUS304TA) about 100 $\mu$m thick.

A pair of protuberances, namely, pivots 22 as shown in FIG. 4 are provided on an under surface (surface on the side of the magnetic disk) of a flange portion 16a of the bearing housing 16. A pair of these pivots 22 are provided at such locations as they are axially symmetric with respect to a center axis that is a center in a longitudinal direction (the direction to connect the mounting part of the magnetic head slider and the coil of the VCM) of the support arm 10, and a straight line connecting both of them passes through an axial center of the bearing housing 16, and they are constructed so that tip ends of these pivots 22 abut to the support arm 10. Consequently, the support arm 10 is supported by the leaf spring 14 in the state in which it abuts to the tip ends of the pivots 22 and is axially supported, and the support arm 10 is biased in a direction orthogonal to the surface of the magnetic disk 17. In this case, the straight line connecting the tip ends of a pair of the pivots 22 becomes an axis for vertical rotation 25b of the support arm 10, accordingly, the HAA.

The leaf spring 14 provides an elastic force in the direction shown by an arrow 23 to the support arm 10 having rigidity. Thus, the support arm 10 rotationally moves around fulcrums of the pivots 22 to move the dimple 11a of the load beam 11 having rigidity in the direction of an arrow 24 causing that a load is applied to the magnetic head slider 13.

According to this construction, the support arm 10 and the load beam 11 can be constructed by members with high rigidity, and therefore resistance against the impact applied form outside can be enhanced. In addition, a resonance frequency can be increased by using the arm with high rigidity, thus making it possible to perform positioning with high precision at a high speed without causing an unnecessary vibration mode.

The important point in this embodiment is that a position of a center of gravity of the HAA is displaced to a predetermined position 26 nearer to the VCM coil 19 than the axis for vertical rotation 25b that is the pivots 22, on the axis line of the arm member 10. The position of the center of gravity is deviated on the axis line of the arm member 10 without conforming to the axis for vertical rotation 25b that is the fulcrum, whereby it is made possible to keep the load applied to the magnetic head slider 13 substantially constant irrespective of a positive and negative direction and a value of the impact acceleration applied from outside, and it becomes possible to enhance impact resistance dramatically.

Figure 5:
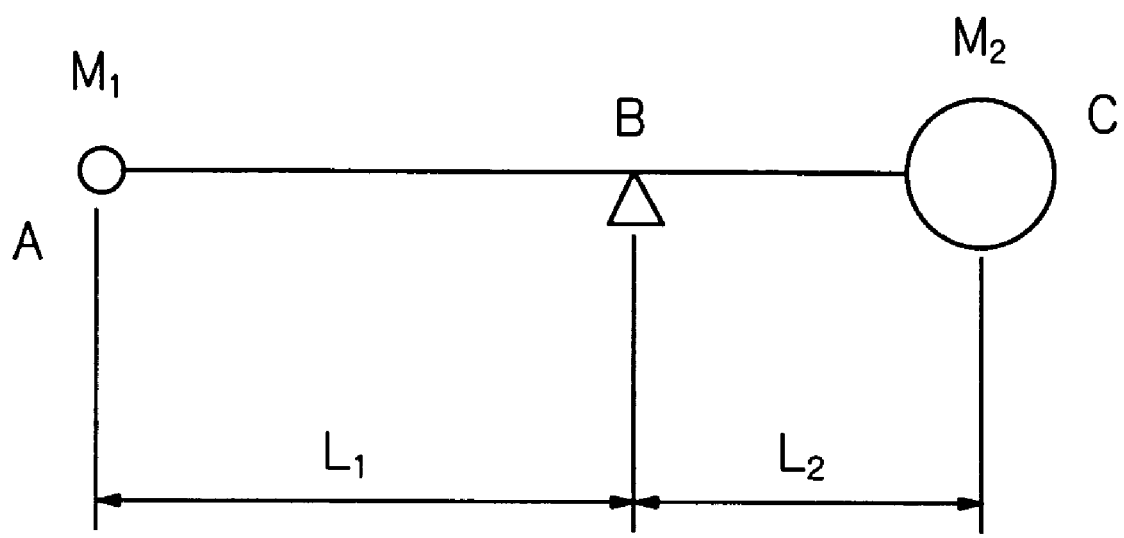
FIG. 5 is a view illustrating a position of center of gravity to be displaced with use of a model of simple material particles and a beam without having a mass.

The position of the center of gravity to be displaced will be explained using a model of the simple particles and the beam having no mass, shown in FIG. 5.

Here, if it is assumed that point A is a load application point to the magnetic head slider 13, point B is a fulcrum, point C is a center of gravity, an impact acceleration applied from an outside is $\alpha$, a gravitational acceleration is G, a distance between the point A and the point B is $L_1$, a distance between the point B and the point C is $L_2$, a force a particle $M_1$ exerts on the point A is Fa, a force a particle $M_2$ exerts on the point A is Fa', and a force the particle $M_2$ generates at the point C is Fc, $$Fa = M_1 \times \alpha$$

Fa'=Fc×$L_2/L_1$. Since a change in a load at the point A at the time of the application of the impact acceleration is Fa−Fa', if this is zero, the load to the magnetic head slider does not change even if the impact acceleration is applied. Accordingly, $$(M_1 - M_2 \times L_2/L_1) \times (\alpha - G) = 0$$

becomes this condition. Namely, the position of the center of gravity may be any position if only it substantially satisfies $L_2 = M_1 \times L_1/M_2$.

FIGS. 6A, 7A, 8A, 9A and 10A respectively illustrate the simulation results of loads (dimple loads) applied to the magnetic head slider with respect to impact acceleration applied in a Z-axis direction (a direction orthogonal to the magnetic disk surface) of the models with positions of center of gravity set at different positions from one another. FIGS. 6B, 7B, 8B, 9B and 10B respectively illustrate the simulation results of reaction forces (reaction forces at fulcrums that are pressing sections) at vertical rotation axis positions with respect to the impact acceleration applied in the Z-axis direction (the direction orthogonal to the magnetic disk surface) of the models with the positions of the center of gravity set at the different positions from one another similarly to the above.

The models used are assumed to be metal springs 80 $\mu$m thick and 2 mm wide, which meet the stress condition (<60 kgf/mm$^2$), and obtain the reaction force with the amount pressed in the Z-axis direction at the fulcrums being fixed at 70 $\mu$m.

Figure 6A:
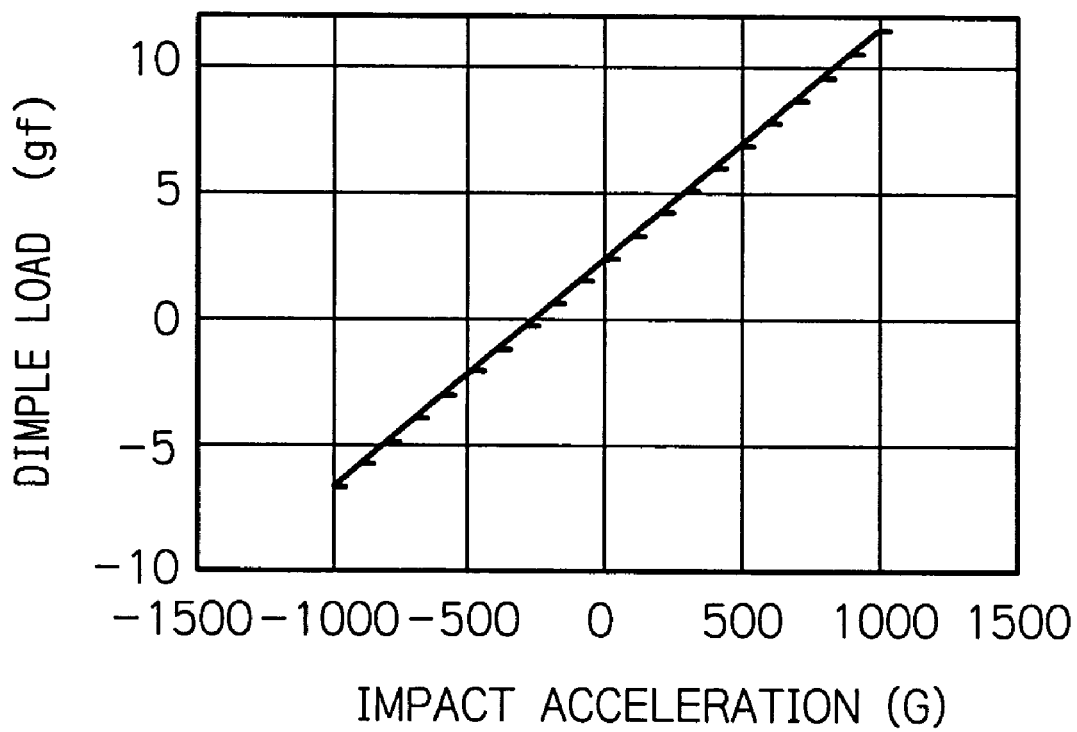
FIG. 6A is a characteristic chart illustrating a result of simulating a dimple load with respect to an impact acceleration applied in a Z-direction.
Figure 6B:
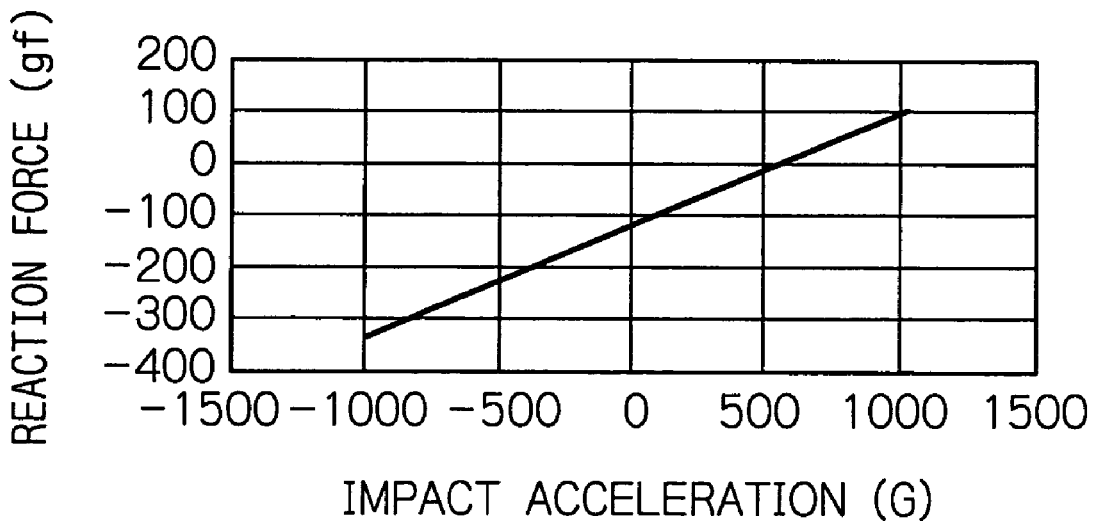
FIG. 6B is a characteristic chart illustrating a result of simulating a reactive force at a vertical rotation axis position with respect to the impact acceleration applied in the Z-axis direction.
Figure 7A:
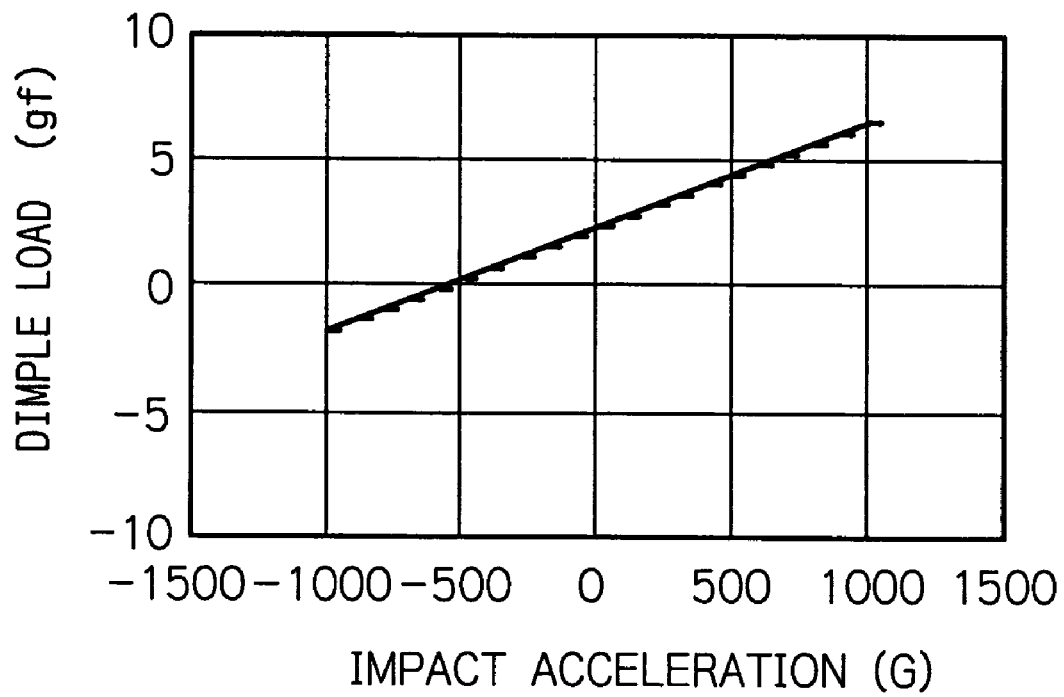
FIG. 7A is a characteristic chart illustrating a result of simulating a dimple load with respect to the impact acceleration applied in the Z-axis direction.
Figure 7B:
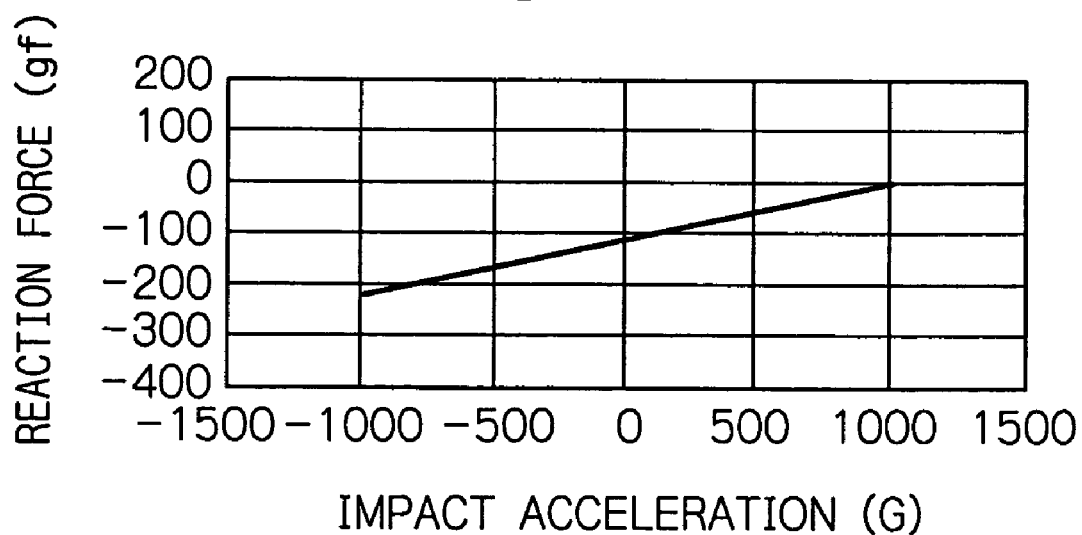
FIG. 7B is a characteristic chart illustrating a result of simulating the reactive force at the vertical rotation axis position with respect to the impact acceleration applied in the Z-axis direction.
Figure 8A:
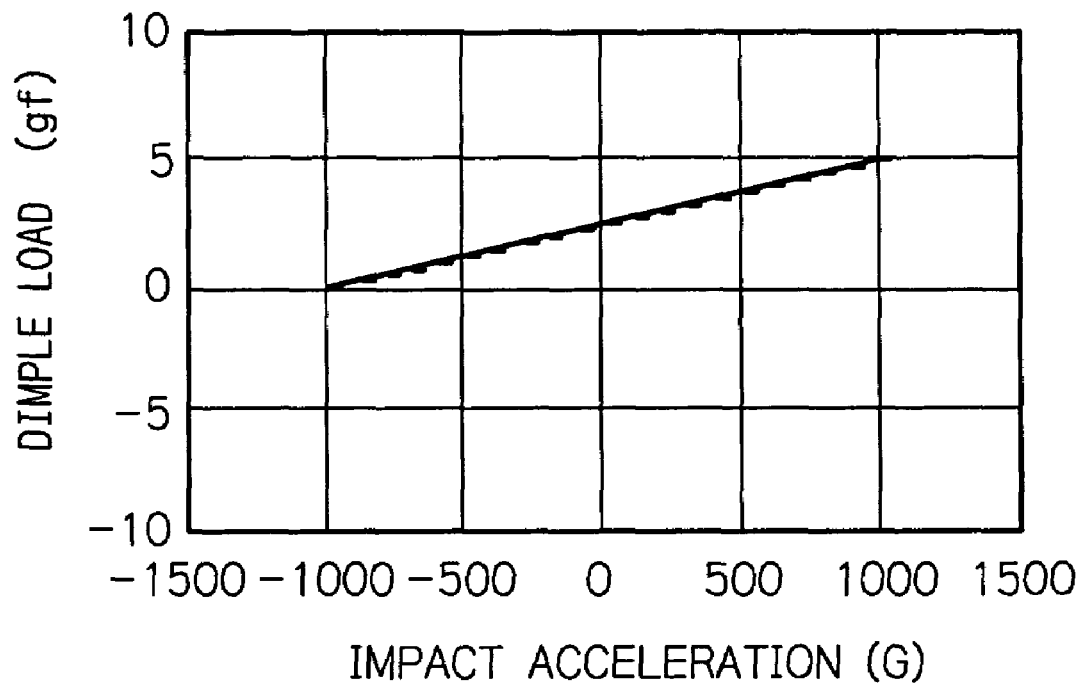
FIG. 8A is a characteristic chart illustrating a result of simulating the dimple load with respect to the impact acceleration applied in the Z-axis direction.
Figure 8B:
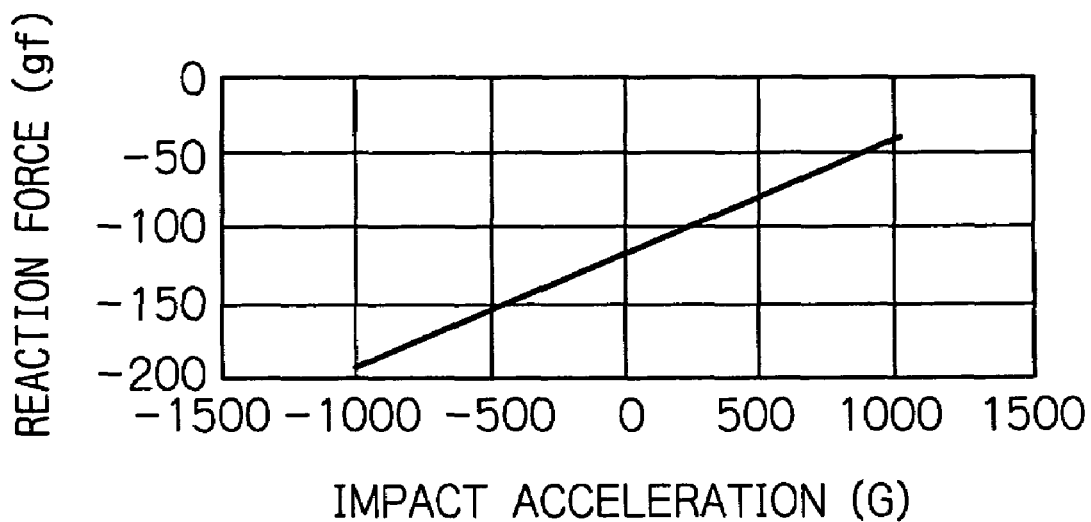
FIG. 8B is a characteristic chart illustrating a result of simulating the reactive force at the vertical rotation axis position with respect to the impact acceleration applied in the Z-axis direction.
Figure 9A:
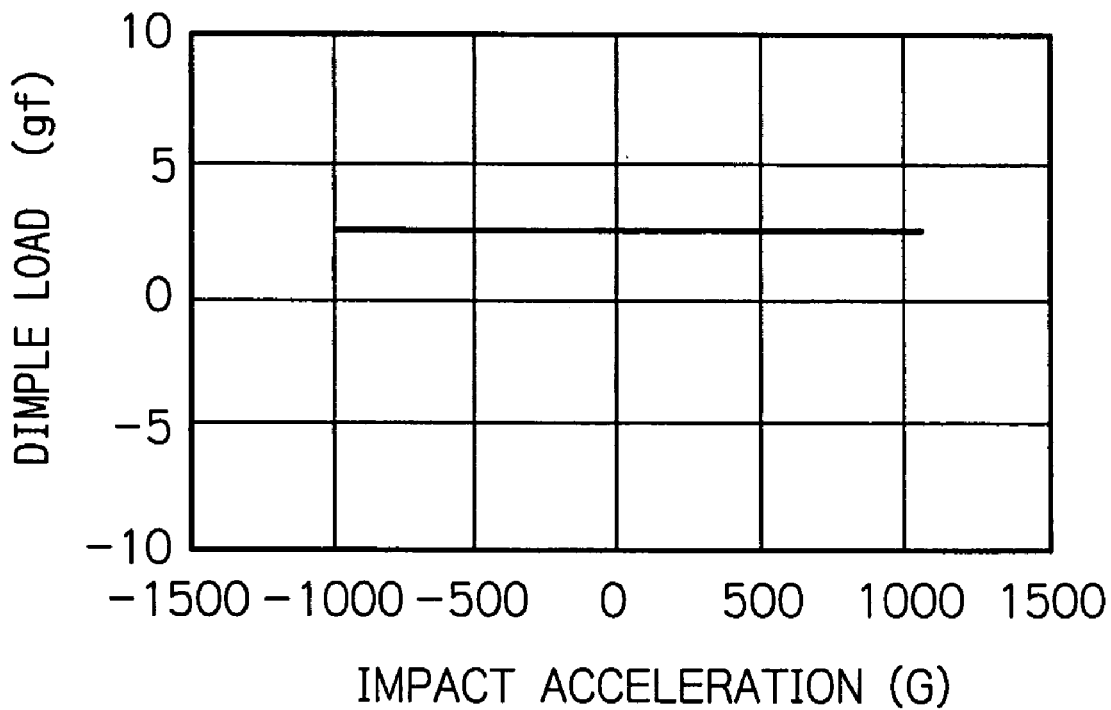
FIG. 9A is a characteristic chart illustrating a result of simulating the dimple load with respect to the impact acceleration applied in the Z-axis direction.
Figure 9B:
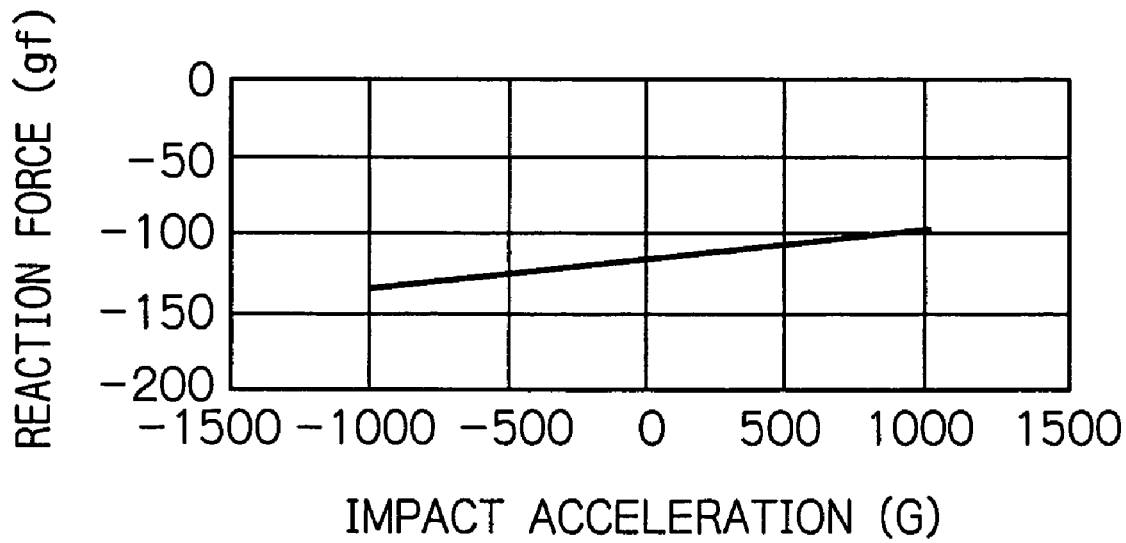
FIG. 9B is a characteristic chart illustrating a result of simulating the reactive force at the vertical rotation axis position with respect to the impact acceleration applied in the Z-axis direction.
Figure 10A:
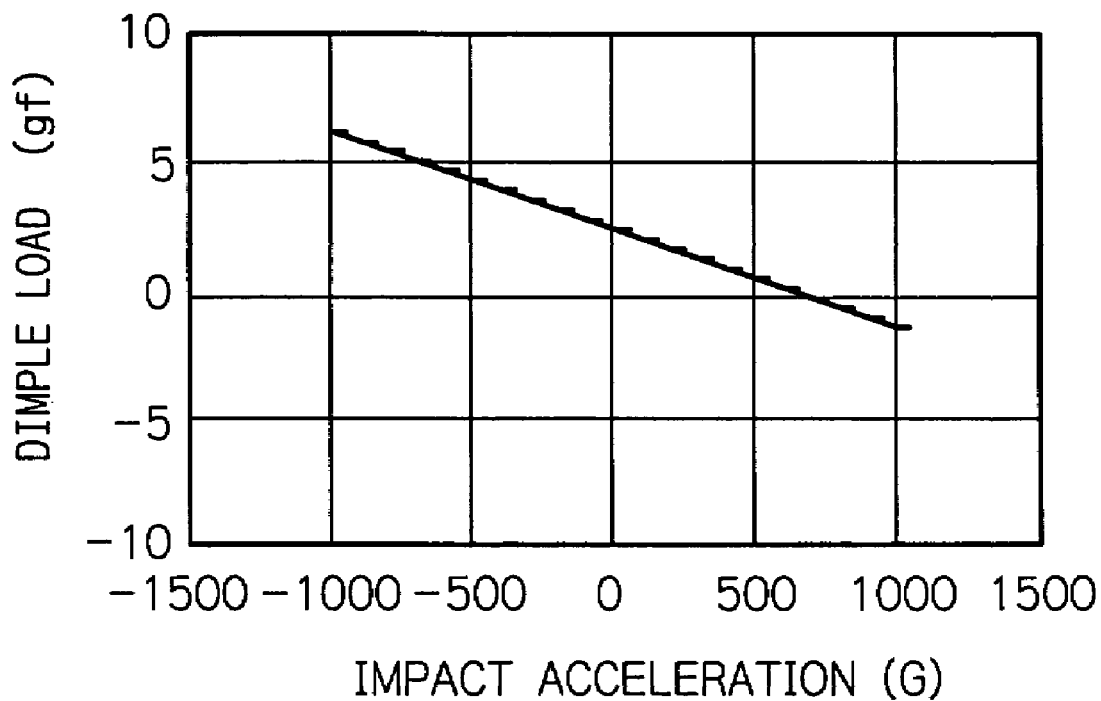
FIG. 10A is a characteristic chart illustrating a result of simulating the dimple load with respect to the impact acceleration applied in the Z-axis direction.
Figure 10B:
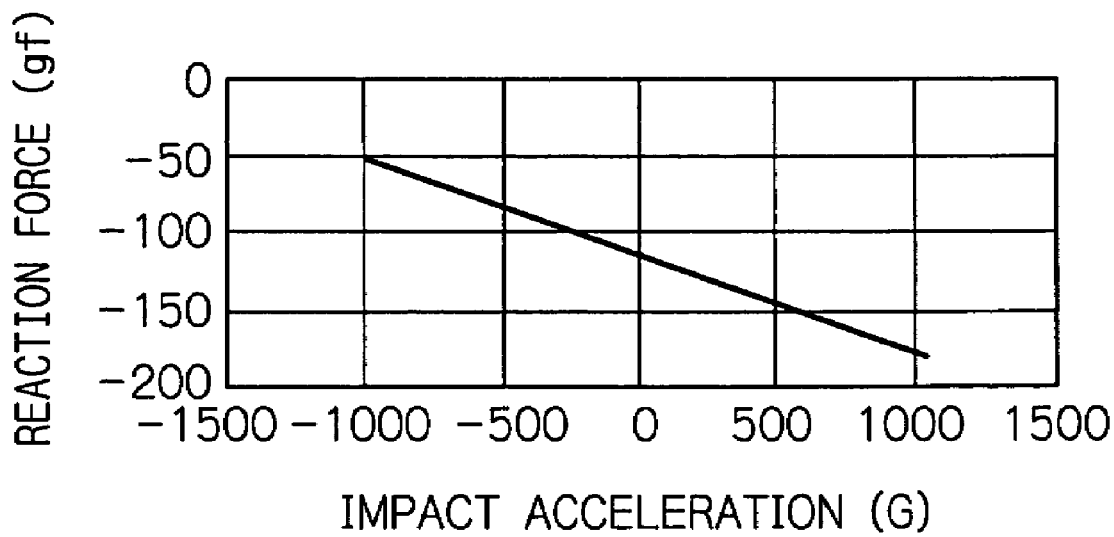
FIG. 10B is a characteristic chart illustrating a result of simulating the reactive force at the vertical rotation axis position with respect to the impact acceleration applied in the Z-axis direction.

FIGS. 6A and 6B are the cases of the model with the position of the center of gravity being displaced to the magnetic head slider by 1.3 mm from the vertical rotation axis (fulcrum), FIGS. 7A and 7B are the cases of the model with the position of the center of gravity being located at the same position as the fulcrum, FIGS. 8A and 8B are the cases of the model with the position of the center of gravity being displaced to the VCM by 0.036 mm from the fulcrum, FIGS. 9A and 9B are the cases of the model with the position of the center of gravity being displaced to the VCM by 0.087 mm from the fulcrum, and FIGS. 10A and 10B are the cases of the model with the position of the center of gravity being displaced to the VCM by 1.51 mm from the fulcrum.

In case that the position of the center of gravity is displaced to the magnetic head slider from the fulcrum, in case that the position of the center of gravity is made to correspond to the fulcrum, and in case that the position of the center of gravity is slightly displaced to the VCM from the fulcrum as shown in FIGS. 6A to 8B, the load (dimple load) applied to the magnetic head slider changes depending upon the values of the impact acceleration applied from outside.

On the other hand, in case that the position of the center of gravity is displaced to the VCM by about 0.087 mm from the fulcrum as shown in FIGS. 9A and 9B, the original load by the leaf spring 14, a force directly applied due to the applied impact acceleration, and the load given by the rotational moment of the force occurring to the center of gravity due to the applied impact acceleration are applied to the load point of the magnetic head slider with a balance being kept between them. Consequently, the dimple load is substantially kept constant regardless of the negative and positive direction and the value of the impact acceleration applied from outside, and therefore it becomes possible to enhance resistance against impact dramatically.

Further, in case that the position of the center of gravity is further displaced to the VCM side as shown in FIGS. 10a and 10b, the dimple load is changed in the reverse direction depending upon the value of the impact acceleration applied from outside.

As described above, by displacing the position of the center of gravity from the vertical rotation axis to the predetermined position, the resistance against impact of the HAA can be substantially improved. On the other hand, by adjusting the displacement amount and the positive and negative direction of the position of the center of gravity, the load property applied to the head slider with respect to the impact acceleration applied from outside can be changed, and therefore it becomes possible to compensate positive pressure or negative pressure occurring to the ABS of the magnetic head slider by this displacement amount. As a result, the degree of freedom of the ABS design of the magnetic head slider is substantially improved, and it also becomes possible to obtain a desired flying property with respect to the head slider with a very small ABS area.

Figure 11:
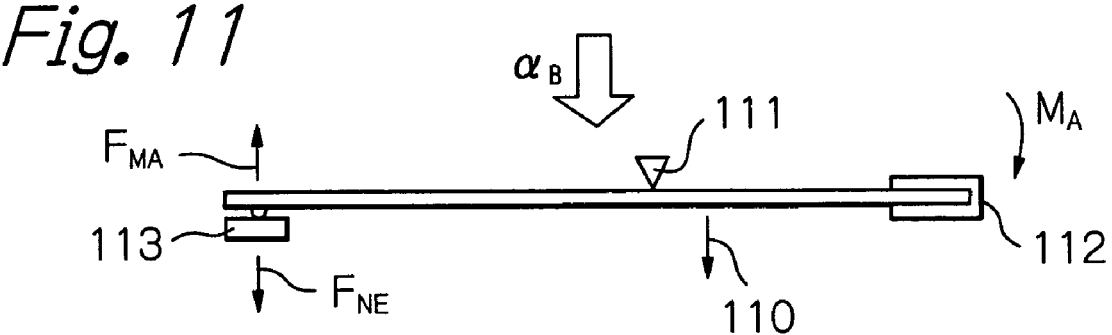
FIG. 11 is a view illustrating the constitution of the present invention more generally.

More generally, the weight and the position of the center of gravity of the entire HAA is set so that a force $F_{MA}$, which is applied to the magnetic head slider 113 by a rotational moment $M_A$ occurring based on an applied impact acceleration $\alpha_A$ and displacement of the position 110 of the center of gravity from the fulcrum position 111, becomes negative pressure $F_{NE}$, which occurs to the ABS of this magnetic head slider 113, or less, when a position of center of gravity 110 is displaced to the VCM coil 112 from a pivot (fulcrum) position 111 so that $L_2 > M_1 \times L_1/M_2$ as shown in FIG. 11 (where $M_1$: mass at the load point to a magnetic head slider 113, $M_2$: mass at a position 110 of center of gravity, $L_1$: distance between a load point to the magnetic head slider 113 and the fulcrum 111, $L_2$: distance between the fulcrum 111 and the position 110 of the center of gravity).

Figure 12:
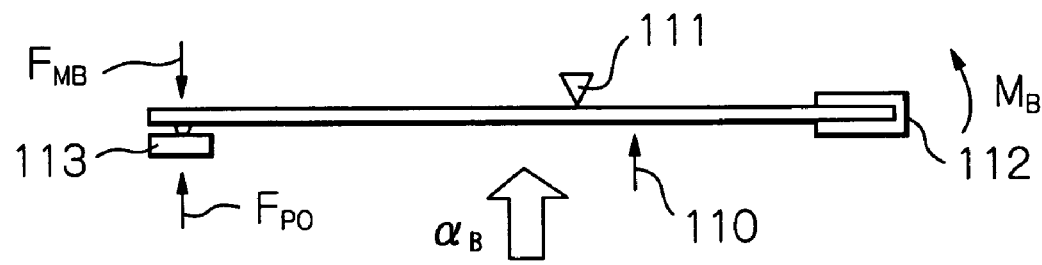
FIG. 12 is a view illustrating the constitution of the present invention more generally.

When the position of the center of gravity is displaced to the VCM under the condition of $L_2 > M_1 \times L_1/M_2$ as described above, with respect to the impact acceleration applied in the reverse direction, the weight and the position of the center of gravity of the entire HAA are set so that a force $F_{MB}$, which is applied to the magnetic head slider 113 by a rotational moment $M_B$ occurring based on the impact acceleration $\alpha_B$ and displacement of the position 110 of the center of gravity from the fulcrum position 111, becomes positive pressure $F_{po}$, which occurs to the ABS of this magnetic head slider 113, or less, as shown in FIG. 12. In other words, the ABS of the magnetic head slider 113 is designed so that the positive pressure $F_{PO}$, which is not less than the product of an inertial force obtained from the mass of the part from the position 110 of the center of gravity to the magnetic head slider 113 and the applied impact acceleration $\alpha_B$, occurs.

Figure 13:
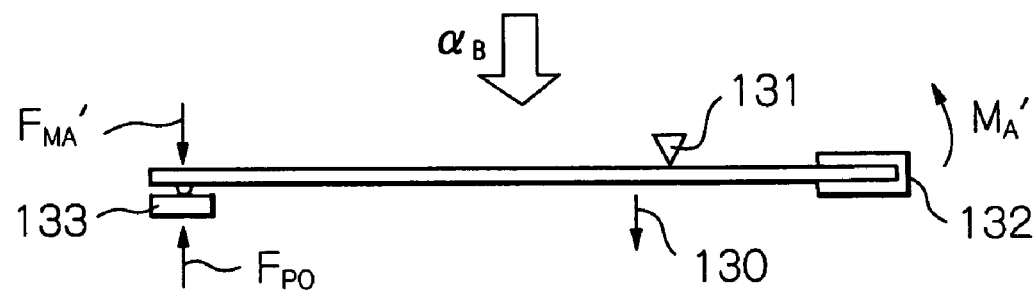
FIG. 13 is a view illustrating the constitution of the present invention more generally.

The weight of the entire HAA and the position of the center of gravity are set so that a force $F_{MA}$, which is applied to the magnetic head slider 133 by a rotational moment $M_A$ occurring based on an applied impact acceleration $\alpha_A$ and displacement of the position 130 of the center of gravity from the fulcrum position 131, becomes positive pressure $F_{po}$, which occurs to the ABS of this magnetic head slider 133, or less, when a position 130 of center of gravity is displaced a the magnetic head slider 133 from a fulcrum position 131 so that $L_2 < M_1 \times L_1/M_2$ (where $M_1$: mass at the load point to the magnetic head slider 133, $M_2$: mass at a position 110 of center of gravity, $L_1$: distance between a load point to the magnetic head slider 133 and the fulcrum 111, $L_2$: distance between the fulcrum 111 and the position 110 of the center of gravity), or when the position 130 of the center of gravity is displaced to a VCM coil 132 (not shown), as shown in FIG. 13.

Figure 14:
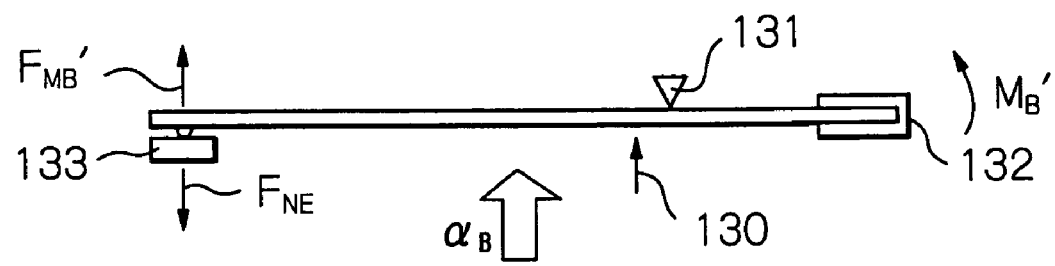
FIG. 14 is a view illustrating the constitution of the present invention more generally.

When the position of the center of gravity is displaced to the magnetic head slider or the VCM under the condition of $L_2 < M_1 \times L_1/M_2$ as described above, with respect to the impact acceleration applied in the reverse direction, the weight and the position of the center of gravity of the entire HAA are set so that a force $F_{MB}$, which is applied to the magnetic head slider 133 by a rotational moment $M_B$ occurring based on the impact acceleration $\alpha_B$ and displacement of the position 130 of the center of gravity from the fulcrum position 131, becomes negative pressure $F_{NE}$, which occurs to the ABS of this magnetic head slider 133, or less, as shown in FIG. 14. In other words, the ABS of the magnetic head slider 133 is designed so that the negative pressure $F_{NE}$, which is not less than the product of an inertial force obtained from the mass of the part from the position 130 of the center of gravity to the magnetic head slider 133 and the applied impact acceleration $\alpha_B$, occurs.

The present invention is explained with use of the HAA including the thin film magnetic head element, but the present invention is not limited only to the HAA like this, but it is obvious that the present invention is applicable to the HAA including the head element such as, for example, an optical head element other than a thin-film electromagnetic head element.

Many widely different embodiments of the present invention may be constructed without departing from the spirit and scope of the present invention. It should be under stood that the present invention is not limited to the specific embodiments described in the specification, except as defined in the appended claims.

What is claimed is:

1. A head arm assembly comprising:
   a head slider having at least one head element;
   an arm member for supporting the head slider at one end section;
   an actuator, mounted to the other end section of the arm member, for rotationally moving the arm member in a direction substantially parallel with a recording medium surface around an axis for horizontal rotation of the arm member; and a load generation means for generating a load for energizing said head slider in a direction to the recording medium surface by rotationally moving said arm member in a direction substantially orthogonal to said recording medium surface around an axis for vertical rotation, the position of the center of gravity of the head arm assembly being located at a different position from said axis for vertical rotation on a center axis of said arm member.

2. The head arm assembly as claimed in claim 1, wherein a force applied to said head slider by a rotational moment occurring due to an applied impact acceleration and a displacement of said position of the center of gravity is set to be not more than a pressure occurring to an air bearing surface of said head slider due to rotation of said recording medium.

3. The head arm assembly as claimed in claim 1, wherein said position of the center of gravity is located at a position between said actuator and said axis for vertical rotation.

4. The head arm assembly as claimed in claim 3, wherein said position of the center of gravity is a position which substantially satisfies $L_2 = M_1 \times L_1 / M_2$, where $M_1$ is a mass at a load point to said head slider, $M_2$ is a mass at said position of the center of gravity, $L_1$ is a distance between a load point to said head slider and said axis for vertical rotation, $L_2$ is a distance between said axis for vertical rotation and said position of the center of gravity.

5. The head arm assembly as claimed in claim 3, wherein when said position of the center of gravity is at a position which substantially satisfies $L_2 > M_1 \times L_1 / M_2$, where $M_1$ is a mass at a load point to said head slider, $M_2$ is a mass at said position of the center of gravity, $L_1$ is a distance between a load point to said head slider and said axis for vertical rotation, $L_2$ is a distance between said axis for vertical rotation and said position of the center of gravity, an air bearing surface of said head slider is set so that positive pressure occurring to the air bearing surface due to rotation of said recording medium is not less than a product of an inertial force obtained from a mass of a part from said position of center of gravity of the head arm assembly to said head slider and an applied impact acceleration.

6. The head arm assembly as claimed in claim 3, wherein when said position of the center of gravity is at a position which substantially satisfies $L_2 < M_1 \times L_1 / M_2$, where $M_1$ is a mass at a load point to said head slider, $M_2$ is a mass at said position of the center of gravity, $L_1$ is a distance between a load point to said head slider and said axis for vertical rotation, $L_2$ is a distance between said axis for vertical rotation and said position of the center of gravity, an air bearing surface of said head slider is set so that negative pressure occurring to the air bearing surface due to rotation of said recording medium is not less than a product of an inertial force obtained from a mass of a part from said position of center of gravity of the head arm assembly to said head slider and an applied impact acceleration.

7. The head arm assembly as claimed in claim 1, wherein said position of the center of gravity is located at a position between said head slider and said axis for vertical rotation.

8. The head arm assembly as claimed in claim 7, wherein when said position of the center of gravity is at a position which substantially satisfies $L_2 < M_1 \times L_1 / M_2$, where $M_1$ is a mass at a load point to said head slider, $M_2$ is a mass at said position of the center of gravity, $L_1$ is a distance between a load point to said head slider and said axis for vertical rotation, $L_2$ is a distance between said axis for vertical rotation and said position of the center of gravity, an air bearing surface of said head slider is set so that negative pressure occurring to the air bearing surface due to rotation of said recording medium is not less than a product of an inertial force obtained from a mass of a part from said position of center of gravity of the head arm assembly to said head slider and an applied impact acceleration.

9. The head arm assembly as claimed in claim 1, wherein said axis for horizontal rotation is provided at a horizontal rotation bearing part located at a midpoint of said arm member, and said axis for vertical rotation comprises a protuberance provided in the vicinity of the horizontal rotation bearing part.

10. The head arm assembly as claimed in claim 9, wherein said load generation means comprises a leaf spring connected to said horizontal rotation bearing part and to said arm member.

11. The head arm assembly as claimed in claim 1, wherein said arm member comprises a support arm having rigidity, and a flexure having elasticity, which is supported at one end section of the support arm and for controlling a flying attitude of said head slider, and the head slider is fixed on the flexure.

12. The head arm assembly as claimed in claim 11, wherein said arm member further comprises a load beam having rigidity and including a load protrusion for applying load to said head slider, said flexure being fixed on the load beam.

13. A disk drive device including at least one head arm assembly that comprises:

a head slider having at least one head element;

an arm member for supporting the head slider at one end section;

an actuator, mounted to the other end section of the arm member, for rotationally moving the arm member in a direction substantially parallel with a recording medium surface around an axis for horizontal rotation of the arm member; and a load generation means for generating a load for energizing said head slider in a direction to the recording medium surface by rotationally moving said arm member in a direction substantially orthogonal to said recording medium surface around an axis for vertical rotation, the position of the center of gravity of the head arm assembly being located at a different position from said axis for vertical rotation on a center axis of said arm member.

14. The disk drive device as claimed in claim 13, wherein a force applied to said head slider by a rotational moment occurring due to an applied impact acceleration and a displacement of said position of the center of gravity is set to be not more than negative pressure or positive pressure occurring to an air bearing surface of said head slider due to rotation of said recording medium.

15. The disk drive device as claimed in claim 13, wherein said position of the center of gravity is located at a position between said actuator and said axis for vertical rotation.

16. The disk drive device as claimed in claim 15, wherein said position of the center of gravity is a position which substantially satisfies $L_2 = M_1 \times L_1 / M_2$, where $M_1$ is a mass at a load point to said head slider, $M_2$ is a mass at said position of the center of gravity, $L_1$ is a distance between a load point to said head slider and said axis for vertical rotation, $L_2$ is a distance between said axis for vertical rotation and said position of the center of gravity.

17. The disk drive device as claimed in claim 15, wherein when said position of the center of gravity is at a position which substantially satisfies $L_2 > M_1 \times L_1/M_2$, where $M_1$ is a mass at a load point to said head slider, $M_2$ is a mass at said position of the center of gravity, $L_1$ is a distance between a load point to said head slider and said axis for vertical rotation, $L_2$ is a distance between said axis for vertical rotation and said position of the center of gravity, an air bearing surface of said head slider is set so that positive pressure occurring to the air bearing surface due to rotation of said recording medium is not less than a product of an inertial force obtained from a mass of a part from said position of center of gravity of the head arm assembly to said head slider and an applied impact acceleration.

18. The disk drive device as claimed in claim 15, wherein when said position of the center of gravity is at a position which substantially satisfies $L_2 < M_1 \times L_1/M_2$, where $M_1$ is a mass at a load point to said head slider, $M_2$ is a mass at said position of the center of gravity, $L_1$ is a distance between a load point to said head slider and said axis for vertical rotation, $L_2$ is a distance between said axis for vertical rotation and said position of the center of gravity, an air bearing surface of said head slider is set so that negative pressure occurring to the air bearing surface due to rotation of said recording medium is not less than a product of an inertial force obtained from a mass of a part from said position of center of gravity of the head arm assembly to said head slider and an applied impact acceleration.

19. The disk drive device as claimed in claim 13, wherein said position of the center of gravity is located at a position between said head slider and said axis for vertical rotation.

20. The disk drive device as claimed in claim 19, wherein when said position of the center of gravity is at a position which substantially satisfies $L_2 < M_1 \times L_1/M_2$, where $M_1$ is a mass at a load point to said head slider, $M_2$ is a mass at said position of the center of gravity, $L_1$ is a distance between a load point to said head slider and said axis for vertical rotation, $L_2$ is a distance between said axis for vertical rotation and said position of the center of gravity, an air bearing surface of said head slider is set so that negative pressure occurring to the air bearing surface due to rotation of said recording medium is not less than a product of an inertial force obtained from a mass of a part from said position of center of gravity of the head arm assembly to said head slider and an applied impact acceleration.

21. The disk drive device as claimed in claim 13, wherein said axis for horizontal rotation is provided at a horizontal rotation bearing part located at a midpoint of said arm member, and said axis for vertical rotation comprises a protuberance provided in the vicinity of the horizontal rotation bearing part.

22. The disk drive device as claimed in claim 21, wherein said load generation means comprises a leaf spring connected to said horizontal rotation bearing part and to said arm member.

23. The disk drive device as claimed in claim 13, wherein said arm member comprises a support arm having rigidity, and a flexure having elasticity, which is supported at one end section of the support arm and for controlling a flying attitude of said head slider, and the head slider is fixed on the flexure.

24. The disk drive device as claimed in claim 23, wherein said arm member further comprises a load beam having rigidity and including a load protrusion for applying load to said head slider, said flexure being fixed on the load beam.

* * * * *